April 23, 1963
L. M. PATTEN ETAL
3,086,563
MILKSHAKE AND FLAVORING MIXING APPARATUS
Filed Feb. 6, 1959
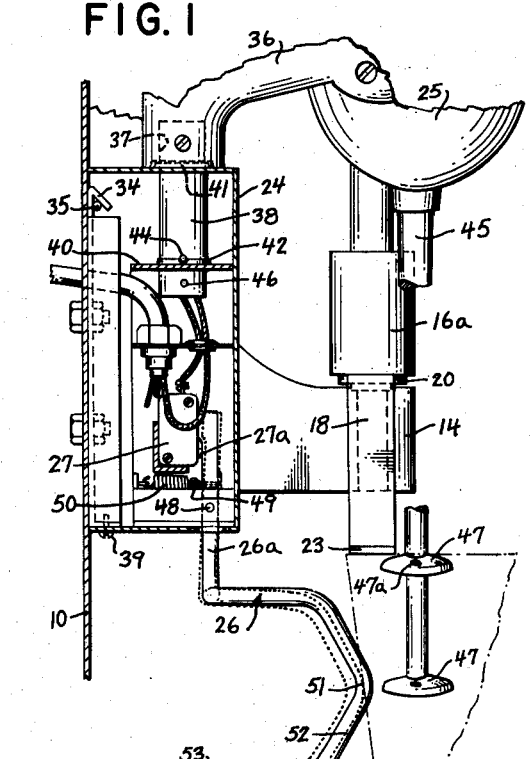
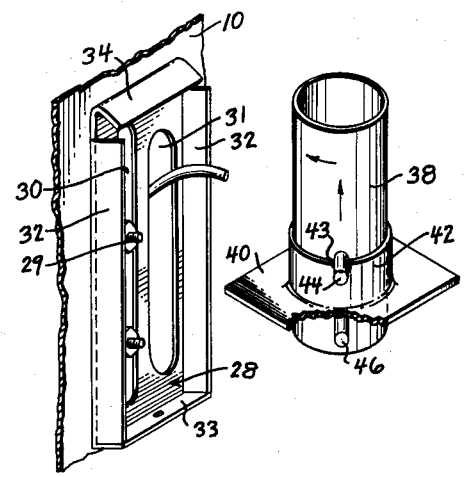
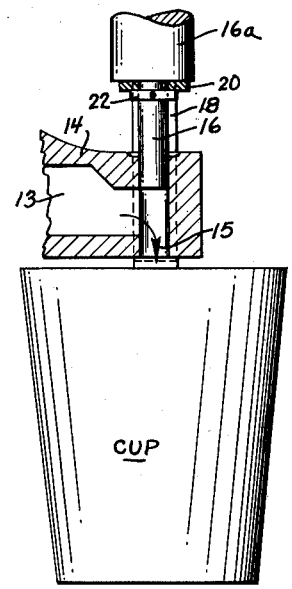
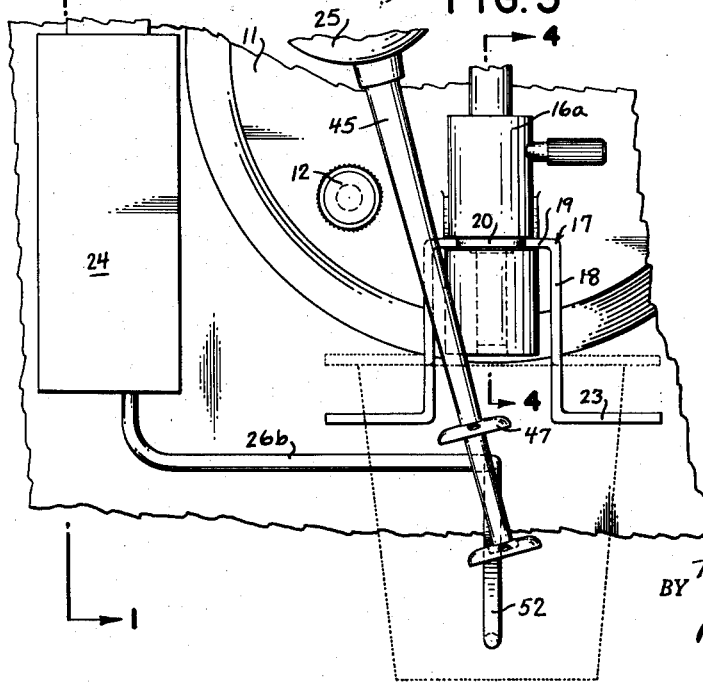
INVENTORS
Leigh M. Patten
Robert C. Ridgway
BY
Barnes & Seed
ATTORNEYS 3,086,563
MILKSHAKE AND FLAVORING MIXING
APPARATUS
Leigh M. Patten and Robert C. Ridgway, Seattle, Wash., assignors to Sweden Freezer Manufacturing Co., Seattle, Wash., a corporation of Washington
Filed Feb. 6, 1959, Ser. No. 791,661
1 Claim. (Cl. 141—69)

The present invention relates to apparatus for simultaneously mixing neutral-base frozen milkshake product with flavoring as the milkshake product is dispensed from a freezer.

More particularly, the invention aims to provide apparatus of simple and economical construction which can be easily mounted on the front of a dispensing freezer and which will automatically mix frozen milkshake drawn from the freezer with a charge of flavoring syrup present in a paper cup or other milkshake container without increasing the drawing time.

A further object is to provide such an apparatus which will thoroughly mix the milkshake and flavoring from top to bottom of the container.

The invention also aims to provide apparatus which will perform the above functions and yet is simple to operate, does not have switches, levers or valves which demand frequent manipulation and attention, and is easily removed for cleaning without use of tools.

Other more particular objects and advantages will, together with these general objects, appear and be understood in the course of the following description and claim, the invention consisting in the novel construction and in the adaptation and combination of parts hereinafter described and claimed.

Referring to the accompanying drawings:

FIGURE 1 is a fragmentary vertical sectional view through a dispensing freezer front illustrating my invention in operative position and taken as indicated by the line 1—1 of FIG. 3.

FIG. 2 is a front perspective view illustrating the back wall bracket of the mounting box.

FIG. 3 is a fragmentary front elevational view of my invention in operative position ready to receive a container and with the dispensing position of the gate lifter and related container being indicated in broken lines.

FIG. 4 is a fragmentary vertical sectional view through the dispensing head as indicated by the line 4—4 of FIG. 3, but with the device in dispensing and mixing operation.

FIG. 5 is a detail perspective view of the mounting of the swing shaft of the mixer.

Referring to the drawings, numeral 10 indicates the front of the housing of a dispensing freezer as for soft ice cream which may be of the general type shown in United States Patent No. 2,737,024, issued March 6, 1956.

The freezing cylinder of the machine has a removable cover plate 11 which is thermally insulated from the housing and is held in place by thumb screws 12. The frozen product is forwardly dispensed by action of a dasher in the cylinder through a passage 13 in a dispensing head 14 which is mounted on the cover plate. At its front end this passage 13 is intersected by a vertical through bore 15 which receives a lift gate 16. Lifting of this gate, as shown in FIG. 4, causes the lower end portion of the bore 15 to serve as a dispensing outlet by exposing the passage 13 to the atmosphere. The gate is gravity closing and continues upwardly as a weighted stem 16a. At its upper end it actuates a switch mechanism (not shown) for starting the dasher in the freezing cylinder when the gate is lifted open so that the frozen product will automatically be dispensed responsive to the act of opening the gate 16. It will be noted that the structure thus far described has the same arrangement as in said Patent No. 2,737,024.

By the present invention the gate 16 is provided with a gate lifter 17 which may be of general U-shape to provide a pair of legs 18 depending from a cross-arm 19 in straddling relation to the boss 14. The cross-arm has an annular enlarged central portion 20 which is sleeved upon the gate 16 to seat above the gate proper between the weighted portion of the stem 16a and a lock collar 22. At their lower ends the leg 18 have a pair of oppositely directed feet 23. When the gate is closed the collar 22 seats on the head 14 and the legs 18 are long enough to position the feet 23 beneath the head a distance corresponding to that required to lift the gate from closed to open position.

Mounted on the freezer housing 10 to one side of the cover plate 11 is a mounting box 24 for carrying an electric mixer 25 and an actuating arm 26. This arm controls a micro-switch 27 housed in the box and wired in series with the motor of the mixer. The back of the box 24, best shown in FIG. 2, is formed by a bracket 28 which has elongated vertical cutouts 30—31 therein, the first for receiving mounting screws 29 and the other for the passage of wiring for the mixer. It can be seen that the length of the cutouts 30—31 permits the bracket 28 to be readily adjusted vertically relative to the freezer front 10.

The bracket 28 also has a pair of longitudinal side flanges 32 and a bottom flange 33 projecting forwardly to interfit with the corresponding walls of the box 24. It will be noted that the side flanges 32 do not extend for the full length of the back member 28 and that the upper end portion of the latter is bent downwardly at an acute angle to provide a locking lip 34. This lip terminates above the side flange 32 to receive a cross-pin 35 which traverses the mounting box at a distance from the bottom thereof corresponding to the distance from the bottom flange 33 to the apex of the locking lip 34. Thus, with the bracket 28 adjusted to the desired height on the freezer front 10 and the necessary wiring connected, mounting of the box 24 is readily completed by backing it such as to introduce the cross-pin 35 over the upper edges of the side flanges 32 and beneath the lip 34 until the box engages the freezer front whereupon a locking screw 39 is threaded into registering holes in the bottom wall of the box and the bottom flange 33. Tightening of this screw 39 raises the box until the cross-pin 35 is seated behind the lip 34 as shown in FIGURE 1. In this position the mounting box is firmly anchored.

The mixer 25 has a hollow swing arm 36 rigidly bolted to the side thereof and turning at an elbow to present a downwardly facing round socket 37. This socket fits over a tubular mixer arm shaft 38 which depends from a set screw connection with the swinging arm through alined openings in the top wall of the box 24 and a lateral shelf 40 in the latter. These openings are preferably defined by struck-up bosses 41—42, respectively. Boss 42 has a positioning notch 43 therein to receive a projecting pin 44 when the swing arm 36 is turned such as to bring the dasher shaft 45 of the mixer into mixing position as shown in FIGURES 1 and 3. It will also be noted that a keeper pin 46 projects from the mixer arm shaft at a point spaced below the shelf 40 a distance slightly greater than the height of the boss 42. With this arrangement the mixer swing arm 36 can be lifted until the pin 44 is raised from the notch 43 and then turned with said pin riding on the top of the boss 42 to swing the mixer into an inactive position away from interference with an opening of the cover plate 11. During this raising and swinging operation the keeper pin 46 prevents the mixer arm shaft 38 from being inadvertently lifted out of the mounting box 24.

As can be seen from FIGURE 1, the mixer 25 is so mounted that its dasher shaft 45 is always parallel to the freezer front 10. However, the dasher shaft is not vertical, but is purposely sloped at about fifteen degrees with the vertical so as to be capable of being swung to bring its lower end into a fore-and-aft plane through the dispensing gate 16 of the freezer as shown in FIGURE 3 and closely adjacent a downward projection of such gate as illustrated in FIGURE 1. At the same time the slope of the dasher shaft does not require that a receptacle of the usual type employed for milkshakes be tilted laterally out of the fore-and-aft plane in order to be introduced over the dasher shaft and beneath the gate 16. Furthermore, this inclination of the dasher has the effect of breaking up the product agitation from a simple horizontal swirling action to one in which the product has vertical motion imparted thereto. The dasher of the mixer may be of several suitable constructions. However, we prefer that the dasher be of the anti-splash type disclosed in the copending application of even date herewtih and namely, one having concavo-convex agitator buttons 47 with vent holes 47a therein mounted on its shaft 45.

Continuing to the actuating arm 26, such has a vertical section 26a which extends upwardly through a slot in the bottom of the box 24 to the front of the loaded micro-switch 27, the latter being a forwardly faced spring button 27a. The arm section 26a is pivoted below the switch on a pin 48 for fore-and-aft movement and is urged by a spring 50 into contact with the switch button 27a. A cotter pin 49 passes through the section 26a to receive one end of the spring 50, the other end of which is anchored to the box structure. The micro-switch is of the normally closed type, and hence in the present case is normally open due to the spring-urged actuating arm.

From the lower end of its vertical section 26a the actuating arm bends horizontally and extends by a horizontal section 26b parallel to the freezer front 10 until it reaches a fore-and-aft plane through the dispensing gate 16. At this point the actuating arm arches forwardly to present in said plane a generally U-shaped receptacle-engaging section whose center portion faces forwardly and is slightly veed, the apex thereof being denoted 51 and the portion of the V therebetween being designated 52. This sloped portion 52 is intended to be engaged by the rim of the receptacle and the horizontal leg 53 at the lower end of the actuating arm serves as a stop to prevent a receptacle from being raised in underlying adjacency to the gate 16 without being shifted into contact with arm portion 52. Since the latter slopes fore-and-aft it can be seen that upward pressure thereon as by the rim of a receptacle will cause the lower part of the actuating arm to swing rearwardly about the pivot 48 in opposition to the spring 50 acting above the latter as shown by the dotted line position in FIGURE 1. As a result, the upper end of the actuating arm is swung out of contact with the micro-switch button 27a thereby causing the micro-switch to close for starting the mixer 25. The apex 51 is preferably at about the same level as the lower end of the dasher shaft 45.

The operator of the present invention first fills his standard cup with the desired amount and kind of flavoring syrup, steps to the freezer and presses the top of the cup against the actuating arm 26 thereby starting the mixer 25. He further raises the cup in up against the feet 23 of the gate lifter 17 so that further upward pressure on the cup raises the gate lifter to open the dispensing passage 13 and start the motor for the dasher in the freezing cylinder. By this time the mixer 25 has attained maximum speed so that as frozen product enters the cup the mixer dasher 45 immediately begins mixing it with the syrup. When the cup has been filled to about an inch from the top the operator lowers the cup and hence lowers the gate 16 to stop product ejection. Mixing continues thereafter until the cup has substantially cleared the mixer dasher and relieves its pressure on the actuating arm.

When it is desired to clean the freezing cylinder, the mixer 25 is raised slightly to lift the pin 44 from the notch 43 and is then swung out of the way with the pin riding on the boss 42. The gate lifter 17 is then lifted out with the gate 16 thereby leaving the cover plate 11 free to be removed after unthreading the thumb screws 12.

To reset the machine for a different cup size the operator removes the screw 39 at the bottom of the mounting box 24, lowers the box until the cross-pin 35 rests on the side flanges 32, and pulls the box forwardly to reveal the mounting screws 29. These can then be adjusted to raise or lower the bracket 28 for a correspondingly shorter or longer cup. The box is then readily remounted by reversing the above steps.

Other more particular objects and advantages will, together with these general objects, appear and be understood in the course of the following description and claim, the invention consisting in the novel construction and in the adaptation and combination of parts hereinafter described and claimed.

What we claim is:

In combination, a dispensing freezer having a freezing cylinder with a removable front cover plate in which there is a discharge opening for frozen product controlled by a dispensing gate, a mixer swingably mounted on said freezer free of said cover plate about a swing axis spaced to one side of said cover plate, said mixer having a rotary dasher swingable from a storage position away from the front of said cover plate into an operative mixing position in which the rotary axis of the dasher remains constant relative to said freezer during operation of the mixer, said dasher sloping downwardly in said mixing position from a top driven end located directly in front of said cover plate above the level of said discharge opening and offset from said discharge gate to a bottom mixing end located below the level of said discharge opening in close adjacency with the path of the frozen product when it discharges from said discharge opening, whereby frozen product discharging through said discharge opening into a container held directly therebeneath can be simultaneously mixed in the container by said dasher, and whereby said cover plate can be removed independently of said mixer when the latter is in its said storage position.

References Cited in the file of this patent

UNITED STATES PATENTS

| | | |
|---|---|---|
| 2,481,731 | Dubin | Sept. 13, 1949 |
| 2,556,494 | Farquhauson | June 12, 1951 |
| 2,737,024 | Swenson | Mar. 6, 1956 |
| 2,737,373 | Kinley | Mar. 6, 1956 |
| 2,855,007 | Erickson et al. | Oct. 7, 1958 |

FOREIGN PATENTS

| | | |
|---|---|---|
| 503,065 | Germany | Nov. 15, 1928 |